(12) United States Patent
Alizon et al.

(10) Patent No.: US 8,584,450 B2
(45) Date of Patent: Nov. 19, 2013

(54) COUPLING OF A TURBOCHARGER WITH AN OXIDATION CATALYST OF AN EXHAUST LINE OF AN INTERNAL COMBUSTION ENGINE

(75) Inventors: Franck Alizon, Verneuil-sur-Seine (FR); Julien-Ange Maestroni, Rueil-Malmaison (FR)

(73) Assignee: Renault S.A.S., Boulogne Billancourt (FR)

( * ) Notice: Subject to any disclaimer, the term of this patent is extended or adjusted under 35 U.S.C. 154(b) by 399 days.

(21) Appl. No.: 12/600,133

(22) PCT Filed: Apr. 11, 2008

(86) PCT No.: PCT/FR2008/050654
§ 371 (c)(1),
(2), (4) Date: Nov. 13, 2009

(87) PCT Pub. No.: WO2008/145886
PCT Pub. Date: Dec. 4, 2008

(65) Prior Publication Data
US 2010/0300072 A1 Dec. 2, 2010

(30) Foreign Application Priority Data
May 14, 2007 (FR) .................................... 07 03452

(51) Int. Cl.
*F01N 1/00* (2006.01)
*F01N 5/04* (2006.01)
*F01N 3/00* (2006.01)
*F01N 3/10* (2006.01)

(52) U.S. Cl.
USPC ................. 60/324; 60/280; 60/295; 60/299; 60/303

(58) Field of Classification Search
USPC ........... 60/280, 295, 299, 303, 324; D12/194; 285/179, 179.1, 181
See application file for complete search history.

(56) References Cited

U.S. PATENT DOCUMENTS

| | | | |
|---|---|---|---|
| 3,690,406 A * | 9/1972 | Weiss | 181/227 |
| D236,712 S * | 9/1975 | Holliday | D12/194 |
| 4,456,883 A * | 6/1984 | Bullis et al. | 324/464 |
| 4,503,680 A | 3/1985 | Wood | |
| 4,559,776 A | 12/1985 | Arai et al. | |

(Continued)

FOREIGN PATENT DOCUMENTS

| | | |
|---|---|---|
| DE | 44 36 415 | 4/1996 |
| EP | 1 054 139 | 11/2000 |

(Continued)

OTHER PUBLICATIONS

Hirata et al., Machine Translation of JP 2005-214170 A, Aug. 11, 2005.*

*Primary Examiner* — Kenneth Bomberg
*Assistant Examiner* — Audrey K Bradley
(74) *Attorney, Agent, or Firm* — Oblon, Spivak, McClelland, Maier & Neustadt, L.L.P.

(57) ABSTRACT

A single-piece and rigid coupling of a turbocharger with an oxidation mechanism of an exhaust line of an internal combustion engine, including a burnt gas inlet duct that extends along an inlet axis and a burnt gas outlet duct that extends along an outlet axis substantially orthogonal to the inlet axis. The inlet and outlet axes are located in two substantially parallel separate planes.

14 Claims, 1 Drawing Sheet

(56) References Cited

U.S. PATENT DOCUMENTS

| | | |
|---|---|---|
| 5,665,318 A | 9/1997 | Rembold et al. |
| D385,523 S * | 10/1997 | Borla .......................... D12/194 |
| 6,179,342 B1 * | 1/2001 | Shen ............................ 285/179 |
| D499,999 S * | 12/2004 | Bassani ........................ D12/194 |
| 6,969,492 B1 | 11/2005 | Goerigk et al. |
| 2002/0050419 A1 * | 5/2002 | Dooley ......................... 181/228 |
| 2003/0143903 A1 * | 7/2003 | Hellman ..................... 440/89 B |
| 2004/0007037 A1 * | 1/2004 | Yoshino et al. ................ 72/369 |
| 2005/0235632 A1 * | 10/2005 | Tarabulski et al. ............. 60/282 |
| 2007/0227809 A1 * | 10/2007 | Sakurai et al. ................ 181/249 |

FOREIGN PATENT DOCUMENTS

| | | |
|---|---|---|
| FR | 2 891 305 | 3/2007 |
| JP | 2005214170 A * | 8/2005 |
| WO | 2005 073530 | 8/2005 |

* cited by examiner

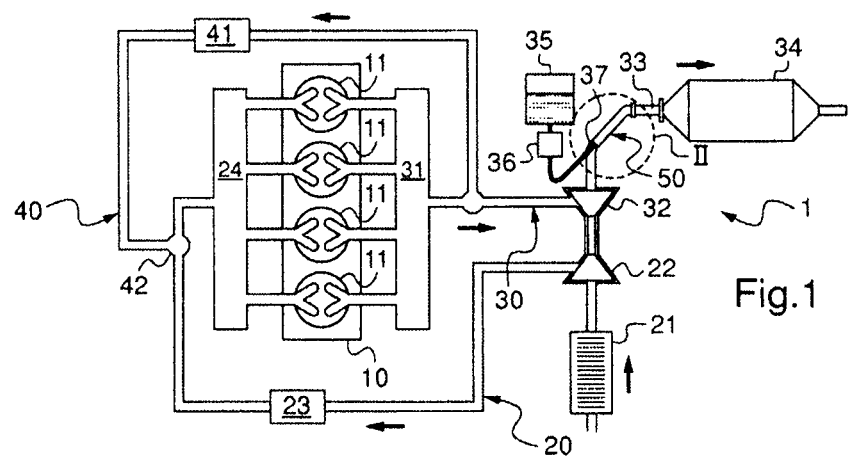
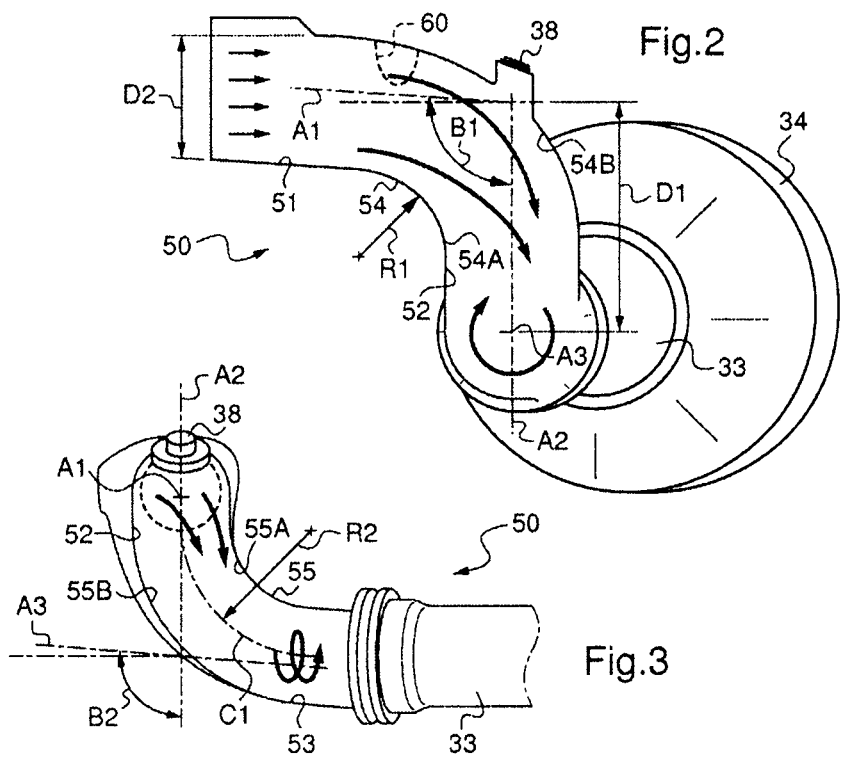

COUPLING OF A TURBOCHARGER WITH AN OXIDATION CATALYST OF AN EXHAUST LINE OF AN INTERNAL COMBUSTION ENGINE

TECHNICAL FIELD TO WHICH THE INVENTION RELATES

The present invention relates in general to the removal of pollution from the burnt gases flowing along the exhaust line of an internal combustion engine.

It relates more particularly to a one-piece and rigid coupling which is capable of coupling a turbocharger to oxidation means of an internal combustion engine exhaust line and which comprises a burnt gases inlet pipe which extends along an inlet axis and a burnt gases outlet pipe which extends along an outlet axis substantially orthogonal to said inlet axis.

It also relates to an internal combustion engine comprising a fresh gas intake line which opens into the cylinders of an engine block and a burnt gases exhaust line which originates in the cylinders, the exhaust line comprising a turbine, means of injecting reducing agent and means of oxidizing the burnt gases.

The invention finds a particularly advantageous application in the creation of diesel engines and lean-burn spark-ignition engines.

TECHNOLOGICAL BACKGROUND

The burnt gases from internal combustion engines contain numerous pollutants that need to be treated or filtered before these burnt gases are discharged into the atmosphere. Today's challenge in particular is to reduce, not only the emissions of carbon monoxide and of unburnt hydrocarbons, but also the emissions of pollutant soot (pollutant particles) and oxides of nitrogen.

The exhaust line of an engine for this purpose comprises an oxidation catalytic converter followed, in the direction in which the burnt gases flow, by a particulate filter.

The oxidation catalytic converter is coated with a catalytic material intended to store the oxides of nitrogen and, in the presence of oxygen, allow carbon monoxide and the unburnt hydrocarbons to be oxidized. The build-up of oxides of nitrogen on the catalytic material decreases the efficiency of the oxidation catalytic converter.

The particulate filter for its part is designed to filter and store polluting particles. The build-up of particulates in the filter impedes the removal of the burnt gases, causing an increase in the pressure of the burnt gases that is detrimental to the operation of the internal combustion engine.

There are two conventional known techniques for treating the pollutant particles and the oxides of nitrogen that have become trapped in the catalytic converter and in the filter.

A first technique is to inject fuel into the exhaust line during a filter regeneration phase, this leading to a highly exothermic oxidation reaction of the fuel in the oxidation catalytic converter. The burnt gases therefore leave the oxidation catalytic converter at a high temperature (of the order of 650° C.) and enter the particulate filter, burning off the pollutant particles with which the latter is filled.

A second technique is to treat the oxides of nitrogen continuously, during normal engine operation. To do this, an aqueous solution of urea is injected into the exhaust line, upstream of the oxidation catalytic converter, using an injector positioned on this exhaust line. This aqueous solution of urea, upon contact with the burnt gases, is converted into ammonia which reacts in the catalytic converter with the oxides of nitrogen.

Whatever the technique used, it is known practice to position an injector of reducing agent (fuel or urea) at the middle of a duct of the exhaust line in such a way that this injector disperses the reducing agent uniformly into the burnt gases. However, creation of the injector, for reasons associated with the thermal integrity of the injector, entails the use of strong and expensive materials.

Another known solution is to inject the reducing agent at an elbow in the exhaust line. Only the tip of the injector then opens into the pipe, which means that the body of the injector is not subjected to excessively high temperatures.

However, in such devices, because the diameters of the pipes are generally small, some of the reducing agent is sprayed onto the walls of this pipe. This proportion of the reducing agent then flows along the pipe, partially evaporating before entering the oxidation catalytic converter. The mixture of burnt gases and of reducing agent is therefore not uniform; on the contrary, most of the evaporated reducing agent is mixed with the burnt gases flowing along close to the walls of the pipe. As a result, the oxidation reactions occur predominantly near the walls of the oxidation catalytic converter. The temperature of the burnt gases is therefore moderately high at the middle of the catalytic converter and extremely high along its walls, carrying the risk of damaging and of prematurely lessening the performance of this catalytic converter. This problem also occurs identically in the particulate filter which then runs the risk of cracking. Moreover, the oxides of nitrogen and the particulates trapped at the middle of the catalytic converter and of the filter are neither treated nor removed.

There is therefore a difficulty in controlling the homogenization of the reducing agent in the burnt gases in order to optimize the oxidation and combustion reactions that take place in the catalytic converter and in the particulate filter.

Document WO 2006/009056 discloses a device comprising, upstream of the injector, a static helix which causes the burnt gases to swirl in the pipe and become homogenized. However, this intrusive component leads to pressure drops that are detrimental to engine efficiency. The design and production of such a component are also difficult because the helix has to have a very good ability to withstand temperature and vibration. A helix such as this appreciably increases the cost of the exhaust line which has also to comprise flanges intended to hold the helix in place. These flanges not only make the pipe heavier, and therefore more sensitive to vibration, but also introduce problems with heat losses. Finally, a helix such as this has of necessity to be installed in a straight part of the exhaust line, and this considerably increases the amount of space occupied by the exhaust line.

OBJECT OF THE INVENTION

In order to remedy the aforementioned disadvantages of the prior art, the present invention proposes an exhaust line coupling that effectively homogenizes the burnt gases with the reducing agent without thereby entailing the addition of an intrusive component.

More particularly, the invention proposes a coupling as defined in the introduction, in which the inlet and outlet axes are situated in two separate but substantially parallel planes.

The junction between the inlet and outlet pipes is created by means of two successive elbows.

The stream of burnt gases leaving the turbine of the turbocharger enters the inlet pipe of the coupling at a speed that is substantially uniform across the entire cross section of the pipe. By virtue of the invention, when the burnt gases enter the first elbow, they are diverted toward the extrados of this first elbow. Then, when they enter the second elbow, they are once again diverted so that they exhibit a swirling movement the axis of which is coincident with the axis of the outlet pipe. This swirling movement is commonly known by its English-language name of "swirl". The coupling therefore behaves like a swirl generator homogenizing the flow of gases passing through it.

Because the burnt gases and the reducing agent are now correctly homogenized, the quantity of (expensive) catalytic material needed in the catalytic converter is reduced. Further, the lengths of the intervals after which the filter has to be regenerated are extended. Finally, by comparison with a conventional exhaust line, no additional component is used to generate the swirl, which means that the reliability of the exhaust line remains identical.

Other advantageous and nonlimiting features of the coupling according to the invention are as follows:
- the inlet and outlet axes are separated from one another by a distance of between 1 and 3 times the diameter of the inlet pipe;
- there is an intermediate pipe which couples the inlet and outlet pipes and which extends along an intermediate axis substantially orthogonal to said inlet and outlet axes;
- the junction between the inlet and intermediate pipes forms a first elbow which comprises an intrados that has a radius of curvature less than 0.4 times the diameter of the inlet pipe;
- the junction between the intermediate and outlet pipes forms a second elbow which has a mid-line whose radius of curvature is less than 0.8 times the diameter of the inlet pipe;
- with the junction between the inlet and intermediate pipes forming a first elbow which has an extrados, means of retaining a reducing-agent injector are provided on said extrados;
- means for retaining a reducing-agent injector are provided on said inlet pipe;
- the inlet and outlet pipes are created as a single piece by casting; and
- the inlet and outlet pipes are created as a single piece by bending a steel tube.

The invention also relates to an internal combustion engine as described in the introduction and which comprises, between the turbine and the oxidation means, a coupling such as this into which the means of injecting a reducing agent open.

BRIEF DESCRIPTION OF THE DRAWINGS

The description which will follow, with reference to the attached drawings, given by way of nonlimiting example, will make it easy to understand the nature of the invention and how it may be embodied.

In the attached drawings:

FIG. 1 is a schematic view of an internal combustion engine according to the invention, comprising, on an exhaust line, one preferred embodiment of a coupling according to the invention; and FIGS. 2 and 3 are detailed views of region II of the FIG. 1, depicted from two different angles.

DETAILED DESCRIPTION

In the description, the terms "upstream" and "downstream" will be used in relation to the direction in which the gases flow from the point at which the fresh gases are taken from the atmosphere as far as the exit of the burnt gases through a catalytic converter 34.

FIG. 1 schematically depicts an internal combustion engine 1 of the diesel type, which comprises an engine block 10 here provided with four cylinders 11.

In the conventional way, the internal combustion engine comprises an electronic device (not depicted) for controlling its various components.

Upstream of the cylinders 11, the internal combustion engine 1 comprises an intake line 20 which comprises an air filter 21 which filters the fresh gases taken from the atmosphere. This intake line 20 also comprises a compressor 22 which compresses the fresh gases filtered by the air filter 21, and a charge air cooler 23 which cools these compressed fresh gases. The intake line 20 opens into an air splitter 24 which conveys the fresh gases to each of the cylinders 11 of the engine block 10.

At the outlet from the cylinders 11, the internal combustion engine 1 comprises an exhaust manifold 31 for burnt gases which is connected to an exhaust line 40 extending as far as means for oxidizing the burnt gases, in this instance formed by the catalytic converter 34. This catalytic converter 34 comprises an oxidation catalytic converter followed, in the direction in which the burnt gases flow, by a particulate filter. As a variant, the catalytic converter could comprise a catalytic particulate filter, that is to say a particulate filter internally coated with a catalytic material.

The exhaust line 30 also comprises, downstream of the exhaust manifold 31, a turbine 32 which drives the compressor 22. It also comprises a coupling 50 which extends through the outlet of the turbine 32 to a flexible hose 33 entering the catalytic converter 34.

The exhaust line 30 further comprises means of injecting a reducing agent into the coupling 50. These injection means comprise a reservoir 35 of reducing agent, a pump 36 which pumps the reducing agent from the tank 35, and an injector 37 which is able to inject the reducing agent under pressure into the coupling 50.

The reducing agent used here is fuel. As a variant, it could consist of an aqueous solution of urea able, upon contact with the burnt gases, to convert into ammonia to reduce the oxides of nitrogen contained in the burnt gases.

Whatever the case, the internal combustion engine 1 also comprises an EGR line 40 for recirculating the burnt gases, known as the recirculated gases. This EGR line 40 accommodates an EGR cooler 41 designed to cool the recirculated gases and an EGR valve 42 for regulating the flow of the recirculated gases. The EGR line 40 originates in the exhaust line 30, between the exhaust manifold 31 and the inlet to the turbine 32, and opens into the intake line 20 between the charge air cooler 23 and the air splitter 24.

The electronic engine control device further comprises two temperature sensors (not depicted) situated at the inlets to the catalytic converter and to the particulate filter, together with two pressure sensors (not depicted) situated at the inlet and outlet of the particulate filter.

As FIGS. 2 and 3 show, the coupling 50 comprises an inlet pipe 51 coupled to the outlet of the turbine 32 by means, for example, of a connecting flange, and an outlet pipe 53 pushed into the flexible inlet hose 33 of the catalytic converter 34.

According to an essential feature of this coupling 50, the axes A1, A3 of the inlet 51 and outlet 53 pipes are situated in two separate but substantially parallel planes. They are separated from one another by a distance D1 of between 1 and 3 times the diameter D2 of the inlet pipe 51.

The inlet axis A1 of the inlet pipe 51 extends along the axis of the outlet from the turbine 32. The inlet pipe 51 here has a substantially circular cross section with a diameter of 50 millimeters. As an alternative, if the exhaust line were provided with a device for short circuiting the turbine (commonly known as a "waste gate" device) comprising a bypass pipe, the inlet pipe could have a lateral opening into which this bypass pipe would emerge.

Advantageously, an intermediate pipe 52 connects the inlet pipe 51 to the outlet pipe 53.

The intermediate pipe 52 extends along an intermediate axis A2 substantially orthogonal to said inlet axis A1. What is meant here by substantially orthogonal to is that the inlet A1 and intermediate A2 axes together form an angle B1 of between 75 and 105 degrees. The junction between this intermediate pipe 52 and the inlet pipe 51 thus forms a first elbow 54.

The outlet axis A3 of the outlet pipe 53 for its part extends along the axis of the flexible inlet hose 33 of the catalytic converter 34, substantially orthogonal to said inlet A1 and intermediate A2 axes. What is meant here by "substantially orthogonal to" is that the intermediate A2 and outlet A3 axes form an angle B2 of between 75 and 105 degrees. The junction between this outlet pipe 53 and the intermediate pipe 52 thus forms a second elbow 55.

As a result, the inlet A1 and outlet A3 axes are situated in two separate but substantially parallel planes separated from one another, at the intermediate axis A2, by a distance D1 of 80 millimeters.

Each elbow 54, 55 has a mid-line that is an arc of a circle, an intrados 54A, 55A and an extrados 54B, 55B. The portion of the interior face of the coupling 50 which is situated on the inside of the elbow and which is convex is what is called the intrados. The extrados is that portion of the interior face of the coupling 50 which is situated on the outside of the elbow and which is concave. The interior face of the coupling 50 is continuous and has no obstacle to impede the flow of the stream of burnt gases.

The inlet pipe 51 comprises means 38 of retaining the injector 37. These retaining means comprise an opening made in the extrados 54B of the first elbow 54 and a ring whose axis is substantially parallel to the intermediate axis A2, bordering the opening. The injector 37 can therefore be fitted into this ring, in such a way as to inject the stream of reducing agent in the form of an injection cone the axis of which is substantially parallel to the intermediate axis A2.

As a variant, the retaining means may be situated in the inlet duct 51. In this variant, the injector comprises an injection tip that has a bent end situated at the middle of the inlet pipe, parallel to the inlet axis. As a result, in this variant, the injector is able to inject the stream of reducing agent in the form of an injection cone the axis of which coincides with the inlet axis.

The inlet pipe 51 might comprise means of retaining a temperature or pressure or richness probe (depicted in dotted line in FIG. 2), the tip 60 of which opens into the inlet pipe.

Advantageously, the intrados 54A of the first elbow 54 has a radius of curvature R1 of less than 20 millimeters (in this instance of 18 millimeters).

As a preference, particularly if a temperature or pressure probe opens into the inlet pipe 51, the mid-line C1 of the second elbow 55 has a radius of curvature R2 of less than 40 millimeters (here of 35 millimeters).

The coupling 50 is one piece and rigid. It is created as a single piece by casting or by bending a steel tube with an inside diameter here equal to 50 millimeters.

When the engine is running, the burnt gases resulting from the combustion of the fresh gases and of the fuel within the cylinders 11 flow into the exhaust line 30 to be treated in the catalytic converter 34 before being discharged into the atmosphere.

Either continuously or at regular intervals, the electronic engine control means command the injection of reducing agent into the coupling 50. This injection may in particular start when the difference in pressure measured between the inlet and the outlet of the particulate filter exceeds a first predetermined threshold value, which signifies that the filter is clogged and needs to be regenerated.

The burnt gases which leave the turbine 32 then rush into the inlet pipe 51 of the coupling 50. At this stage, they have a substantially homogeneous speed in each section of this pipe.

When the burnt gases reach the first elbow 54, the small radius of curvature of the intrados 54A of this first elbow 54 causes an abrupt separation of these burnt gases toward the extrados 54B of this elbow. If there is a probe in the inlet duct 51, the speed of the burnt gases increases in this inlet duct, which means that this separation may occur later. Whatever the case, the burnt gases flowing in the intermediate duct 52 no longer have a homogeneous speed. On the contrary, they have a greater speed on the side of the continuation of the extrados 54B of the first elbow 54 than they do on the side that is the continuation of the intrados 54A of this first elbow.

As they pass through the first elbow 54, the burnt gases mix with the fuel injected by the injector 37, without the mixture being perfectly homogeneous, however.

The short length of intermediate pipe 52 does not give the stream of burnt gases the time to return from the side of the continuation of the intrados 54A of the first elbow 54. As a result, the mixture of burnt gases and of fuel arrives in the second elbow 55 at a tangent to the outlet pipe 53. This tangential arrival generates a swirling movement of the burnt gases in the outlet pipe 53 about the outlet axis A3, this being the movement known by the English-language name of "swirl". Thanks to the small radius of curvature of the second elbow, this rotating of the burnt gases is effective even if the separation of the stream in the first elbow has been late. The swirling movement also encourages the homogenization of the mixture in the outlet duct 53 and in the flexible inlet hose 33 so that the mixture as it enters the catalytic converter 34 is perfectly homogeneous.

The presence of a high level of fuel in the mixture leads to a highly exothermic oxidation reaction of the fuel throughout the oxidation catalytic converter. The burnt gases therefore leave the oxidation catalytic converter at a high temperature and enter the particulate filter, burning off all the pollutant particles with which the latter is filled. Thus, the particulate filter is regenerated effectively.

Finally, when the pressure difference measured between the inlet and outlet of the particulate filter drops back below a second predetermined threshold value, the injection of fuel into the coupling 50 is halted.

The present invention is not in any way restricted to the embodiments described and depicted and the person skilled in the art will be able to vary them in any way that is in accordance with its spirit.

The invention claimed is:
1. A one-piece and rigid coupling between a turbocharger and a catalytic converter of an exhaust line of an internal combustion engine, comprising:
   a burnt gases inlet pipe including an inlet axis that extends along an outlet axis of the turbocharger;

a burnt gases outlet pipe including an outlet axis that extends along an inlet axis of the catalytic converter and substantially orthogonal to the inlet axis of the inlet pipe; and an intermediate pipe that couples the inlet pipe and the outlet pipe, and an intermediate axis of the intermediate pipe is substantially orthogonal to the inlet axis of the inlet pipe and the outlet axis of the outlet pipe, wherein a junction between the inlet pipe and the intermediate pipe forms a first elbow that has an extrados, and the extrados includes means for retaining a reducing-agent injector, wherein the inlet axis of the inlet pipe and the outlet axis of the outlet pipe are situated in two separate but substantially parallel planes and are separated from one another by a distance of between 1 and 3 times a diameter of the inlet pipe to generate a swirling movement of burnt gases in the outlet pipe to homogenize the burnt gases.

2. The coupling as claimed in claim 1, in which the intermediate axis of the intermediate pipe forms an angle of between 75 and 105 degrees with the inlet axis of the inlet pipe.

3. The coupling as claimed in claim 1, in which the intermediate axis of the intermediate pipe forms an angle of between 75 and 105 degrees with the outlet axis of the outlet pipe.

4. The coupling as claimed in claim 1, in which the means for retaining a reducing-agent injector is an opening in the extrados of the first elbow and a ring bordering the opening.

5. The coupling as claimed in claim 1, in which the means for retaining a reducing-agent injector comprise an opening in the extrados of the first elbow and a ring bordering the opening, and an axis of the ring is substantially parallel to the intermediate axis.

6. The coupling as claimed in claim 1, in which the inlet and outlet pipes are created as a single piece by casting.

7. The coupling as claimed in claim 6, in which an inside diameter of the single piece is 50 millimeters.

8. The coupling as claimed in claim 1, in which the inlet and outlet pipes are created as a single piece by bending a steel tube.

9. The coupling as claimed in claim 8, in which an inside diameter of the single piece is 50 millimeters.

10. The coupling as claimed in claim 1, in which the first elbow comprises an intrados that has a radius of curvature less than 0.4 times the diameter of the inlet pipe.

11. The coupling as claimed in claim 10, in which a junction between the intermediate and outlet pipes forms a second elbow that has a mid-line whose radius of curvature is less than 0.8 times the diameter of the inlet pipe.

12. The coupling as claimed in claim 11, in which the diameter of the inlet pipe is 50 millimeters, the radius of curvature of the intrados of the first elbow is less than 20 millimeters, and the radius of curvature of the mid-line of the junction between the intermediate and outlet pipes is less than 40 millimeters.

13. An internal combustion engine comprising:
a fresh gas intake line that opens into cylinders of an engine block and a burnt gases exhaust line that originates in the cylinders, the exhaust line comprising a turbine, means for injecting a reducing agent, and a catalytic converter,
wherein the exhaust line comprises, between the turbine and the catalytic converter, a coupling as claimed in claim 11 into which the means for injecting a reducing agent opens.

14. The internal combustion engine as claimed in claim 13, in which the means for injecting a reducing agent is a reducing agent reservoir, a pump, and an injector.

* * * * *